United States Patent [19]

Nawata et al.

[11] Patent Number: 4,555,653
[45] Date of Patent: Nov. 26, 1985

[54] PULSE MOTOR DRIVING APPARATUS

[75] Inventors: Yoshiaki Nawata, Yokohama; Yasufumi Tanimoto, Fujisawa, both of Japan

[73] Assignee: Tokyo Shibaura Denki Kabushiki Kaisha, Kawasaki, Japan

[21] Appl. No.: 556,786

[22] Filed: Dec. 1, 1983

[30] Foreign Application Priority Data

Dec. 2, 1982 [JP] Japan ................................. 57-211950

[51] Int. Cl.$^4$ ........................................... H02K 29/04
[52] U.S. Cl. ..................................... 318/696; 318/685
[58] Field of Search ................... 318/696, 685; 365/78

[56] References Cited

U.S. PATENT DOCUMENTS 4,093,905  6/1978  von Braun ........................... 318/696
4,300,084 10/1981  Heeren ................................ 318/696

Primary Examiner—William M. Shoop, Jr.
Assistant Examiner—Saul M. Bergmann
Attorney, Agent, or Firm—Cushman, Darby & Cushman

[57] ABSTRACT

A pulse motor driving apparatus has a drive circuit for supplying driving pulses to a pulse motor. This drive circuit switches over the exciting winding phases of the pulse motor on a two-phase unit basis, in response to the exciting phase data supplied by a microprocessor in the driving mode, thereby driving the motor by two-phase excitation. The microprocessor specifies only one of the exciting phases in the stopping mode, so that the pulse motor is stopped by single-phase excitation.

2 Claims, 7 Drawing Figures

F I G. 2
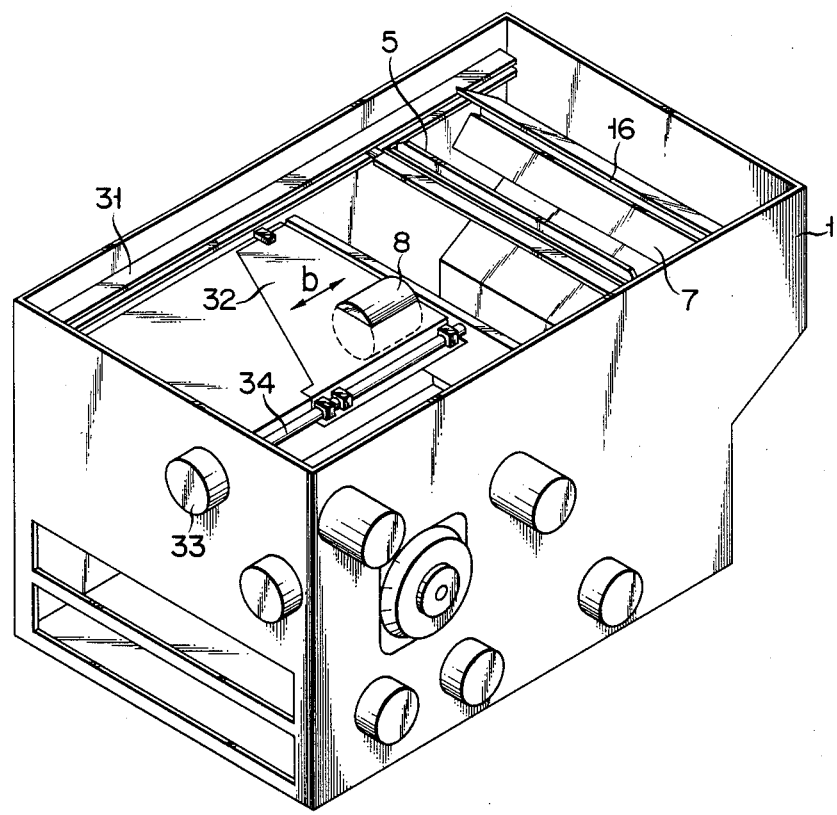

| DATA D0 (T0/Tp) | DATA D1 (T1/Tp) | DATA D2 (T2/Tp) | ——————— | DATA Dn (Tn/Tp) |
|---|---|---|---|---|

F I G. 6
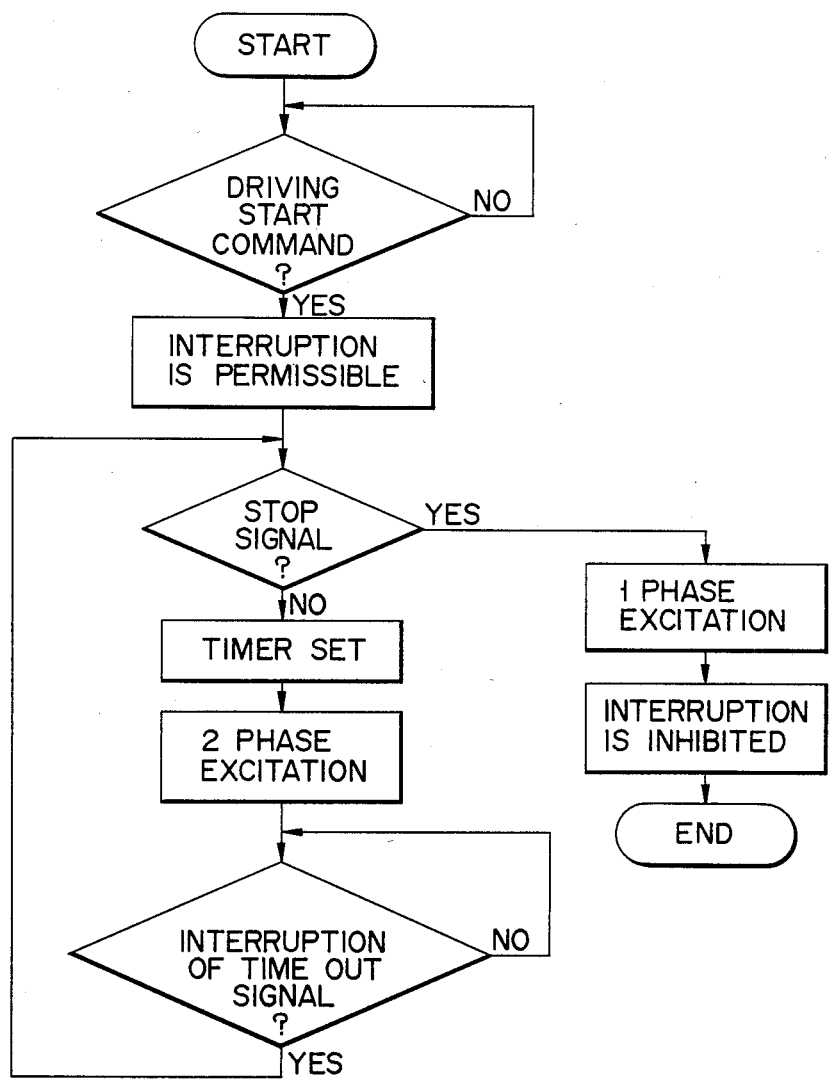

PULSE MOTOR DRIVING APPARATUS

BACKGROUND OF THE INVENTION

The present invention relates to a pulse motor driving apparatus and, more particularly, to a driving apparatus for a pulse motor which is used in a copying machine.

In a copying machine of the fixed document table type, an optical section including an exposure lamp, mirrors, etc., is reciprocatingly moved along the fixed document table, and a document on the document table is optically scanned. When an image of the document is enlarged or reduced in such a copying machine, a lens block provided in the optical section is moved. A pulse motor is used to move this lens block. This pulse motor is driven by a two-phase excitation mode for exciting two phase windings at a time, since a strong torque is needed to move the lens block. However, in this two-phase excitation, when the excitation is cut off (i.e., when the pulse motor stops), the rotor is attracted to one of the two phases whose magnetic force is stronger than the other, and is stopped at the location of that phase. Thus, the stop position of the lens block to be driven by this rotor would have been shifted from the normal position, so that it would be impossible to obtain an accurate magnification, or reduction power.

SUMMARY OF THE INVENTION

An object of the present invention is to provide a pulse motor driving apparatus in which the dislocation of the stopping position of a driven member does not occur when a pulse motor stops.

According to the present invention, a pulse motor driving apparatus is provided in which the pulse motor is driven by a two-phase excitation mode in the motor driving, and the pulse motor is stopped by a single-phase excitation mode in the motor stopping.

BRIEF DESCRIPTION OF THE DRAWINGS

FIG. 2 is a perspective view of the copying apparatus of FIG. 1;

FIG. 6 is a flowchart showing the operation of the pulse motor driving apparatus.

DETAILED DESCRIPTION OF THE PREFERRED EMBODIMENT

Figure 1:
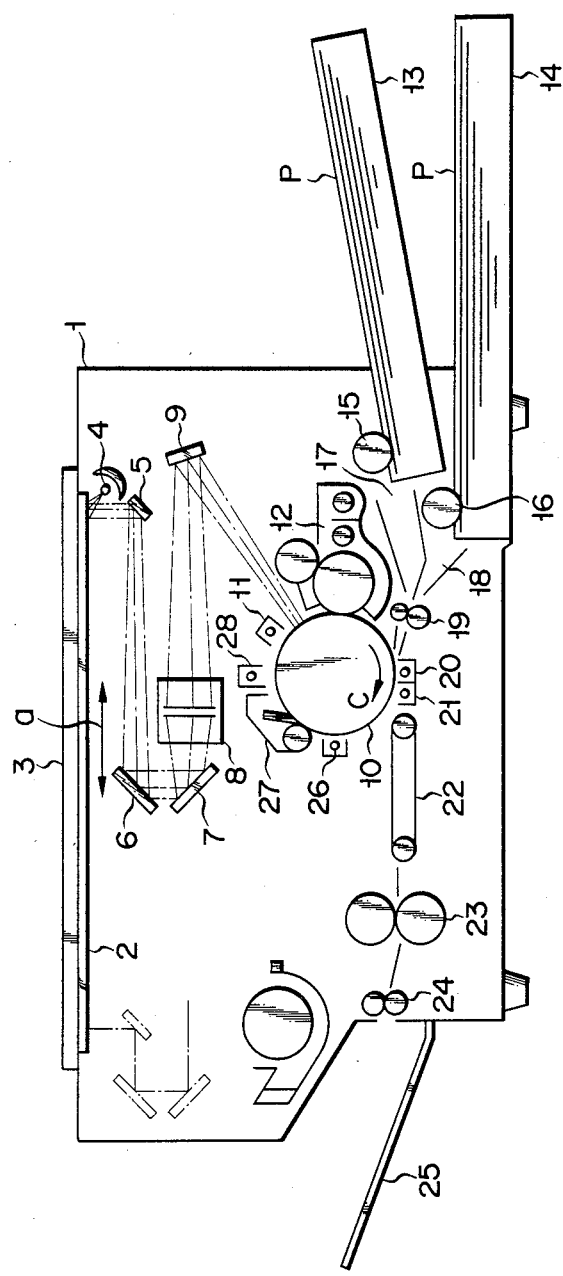
FIG. 1 is a schematic structural view of a copying machine having a pulse motor driving apparatus according to the present invention.

FIG. 1 schematically shows a copying machine of the fixed document table type, according to the present invention.

In the drawings, a document table (transparent sheet of glass) 2 for holding a document is attached to the upper portion of a cabinet 1. A document cover 3 is provided on this document table 2, allowing it to open and close freely. The exposure unit comprising an exposure lamp 4 and mirrors 5, 6 and 7 is reciprocated in the direction indicated by an arrow a along the undersurface of the document table 2, so that a document which was set on the document table 2 is exposed and scanned at the time of its reciprocating movement. In this case, the mirrors 6 and 7 move at one-half the speed of the mirror 5 to keep a constant optical path length. The light which was reflected from the document, due to scanning by the above-mentioned exposure unit; i.e., the light reflected from the document, due to the light irradiation of the exposure lamp 4, is reflected by the mirrors 5, 6, 7. The reflected light, thereafter, passes through a lens block 8, for setting the copy magnification power, is further reflected by a mirror 9, and is finally introduced to a photoconductive drum 10, so that an image of the document may be formed on the surface of the photoconductive drum 10.

As shown in FIG. 2, the above-mentioned lens block 8 is supported by a supporting member 32, which member 32 is guided by guide rails 31 in such a way as to be movable in the direction indicated by arrow b. This supporting member 32 is fixed to a drive shaft 34 coupled to a four-phase pulse motor 33 which is mounted to the side surface of the cabinet 1. When the pulse motor 33 rotates, the supporting member 32 is driven in the direction of the arrow b through this drive shaft 34. The pulse motor 33 is rotated in response to the magnification power level set by a magnification power setting button provided on an operation panel (not shown).

The photoconductive drum 10 rotates in the direction indicated by arrow c, and the surface of the drum 10 is first charged by a charger 11. Thereafter, the image of the document is exposed by the exposure unit, thereby forming an electrostatic latent image on the surface of the drum 10. This electrostatic latent image is visually imaged by supplying a toner from a developing unit 12.

On the other hand, sheets P are pulled out, one by one, by means of a feed roller 15 or 16 from a preselected upper sheet feed cassette 13 or lower sheet feed cassette 14, are guided to resist roller pair 19 through a sheet guide path 17 or 18, and are then sent to a transfer section by the roller pair 19. Both of the sheet feed cassettes 13, 14 are detachably mounted on the lower end portion on the right side of the cabinet 1, and either one of them is selected by the operation panel (not shown). The sheet P which was sent to the transfer section is closely attached to the surface of the photoconductive drum 10 at the portion of a transfer charger 20, so that the toner image on the photoconductive drum 10 is transferred due to the action of the above-mentioned charger 20. This transferred sheet P is peeled off from the photoconductive drum 10 due to the action of a peeling charger 21, and is carried on a sheet carrying path 22 and is sent to fusing roller pair 23 as a fixer provided at its end portion. Thereafter, it passes through this fixing roller pair 23, so that the transferred toner image is fused. The sheet P, after being fused, is fed out by sheet feed-out roller pair 24 to a tray 25 which is mounted on the outside of the cabinet 1. While the photoconductive drum 10 is discharged by a charger 26 after transfer; thereafter, the residual toner on the surface is removed by a cleaner 27, and the residual chargers are further discharged by a fluorescent lamp 28, with the operation then returning to the intial state.

Figure 3:
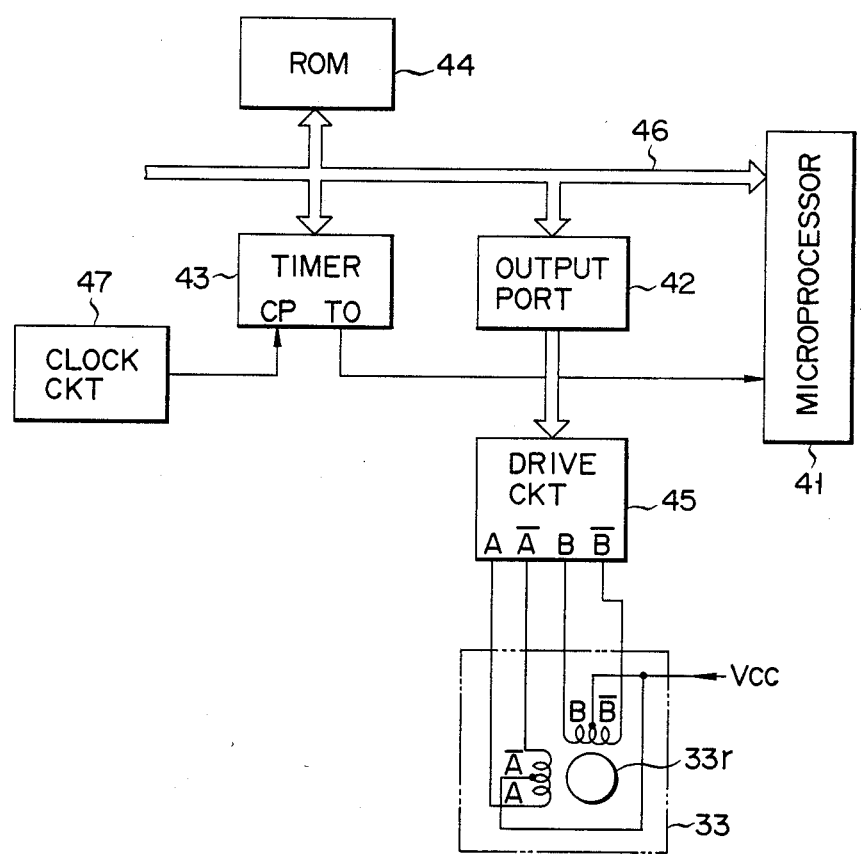
FIG. 3 is a block circuit diagram of the pulse motor driving apparatus.
Figures 4, 5:
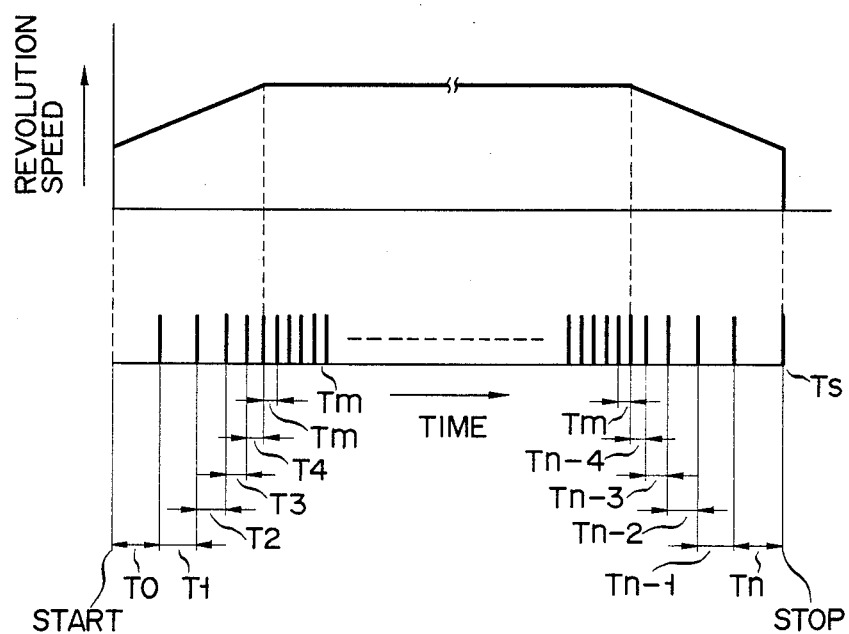
FIG. 4 is a curve showing the driving state of the pulse motor, and a waveform showing the phase change-over timing.
FIG. 5 is a format of the phase change-over data.

The pulse motor driving apparatus may be described as follows, with reference to FIG. 3. A microprocessor 41 as a main control section is connected to an output port 42, a timer 43 and an ROM 44 through a data bus 46. The output port 42 is connected to a drive circuit 45 and output portions, i.e., A-, $\overline{A}$-, B-, and $\overline{B}$-phase output terminals of this drive circuit 45 are connected to the corresponding phase windings of the pulse motor 33. A clock circuit 47 is connected to a CP terminal of the timer 43, and clock pulses having a pulse width Tp are supplied from this clock circuit 47. The phase change-over data in accordance with the rotational curve of the pulse motor 33 has been memorized in the ROM 44. The rotational curve of the pulse motor 33 is shown in FIG. 4. According to this rotational curve, the rotational speed gradually increases at the leading portion, upon starting; and, when it reaches a constant speed, the motor rotates at a uniform velocity. The rotational speed gradually falls, near the stopping position, till the motor comes to a stop. The phase change-over times are determined in accordance with the above-mentioned rotational curve. Thus, as shown in FIG. 4, the phase change-over times gradually become short in the leading portion of the rotation, as indicated by reference characters T0, T1, T2, T3 and T4, and the motor comes to rotate at a uniform velocity at time Tm. The phase change-over times gradually become long in the trailing portion of the rotation as indicated by reference characters Tn-4, Tn-3, Tn-2, Tn-1 and Tn, and the motor stops at time Ts. Each of these phase change-over times T0 to Tn is divided by the clock pulse width Tp to obtain phase change-over data. The phase change-over data corresponding to the times T0 to Tn is stored in the ROM 44. These phase change-over data are indicated as data D0, D1, D2, . . . and Dn in the format of FIG. 5. The data shown in the format of FIG. 5 is set in accordance with each of the magnification and reduction powers.

Figure 7:
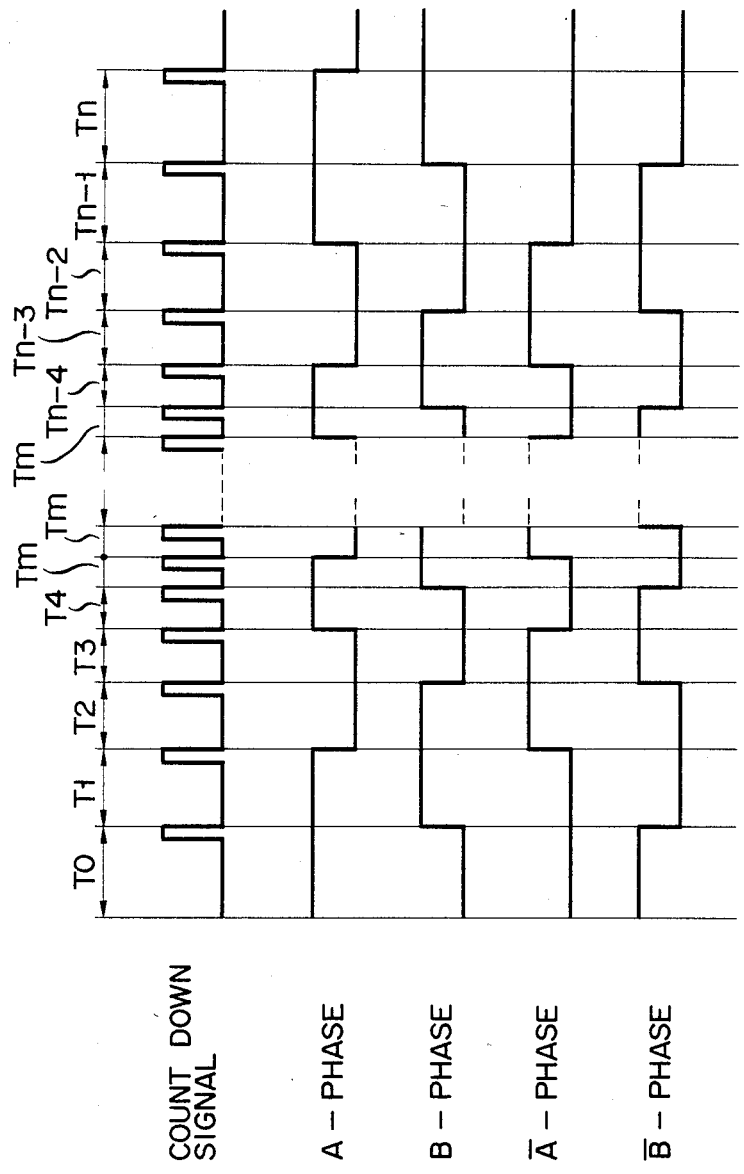
FIG. 7 is a timing chart of the drive pulse of the pulse motor.

The operation of the pulse motor driving apparatus may now be described with reference to the flowchart of FIG. 6 and the timing chart of FIG. 7.

When a desired magnification power is set by the magnification power setting button and a driving command for the lens block 8 is given to the microprocessor 41, the microporcessor 41 comes to the state that the interrupt is permissible and, at the same instant, it is possible for the timer 43 to detect a time-out signal. At this time, the microprocessor 41 specifies a predetermined exciting phase, e.g., the A and $\overline{B}$ phases, and sets the data needed to specify the A and $\overline{B}$ phases into the output port 42. In this state, when the microprocessor 41 reads out the phase change-over time data D0 from the ROM 44 and sets it into the timer 43, the exciting phase A in the stopping position by the drive circuit 45 is switched over to the exciting phases A, $\overline{B}$ which were set into the output port 42. At this time, the driving pulses are supplied to the A- and $\overline{B}$-phase exciting windings of the pulse motor 33, as shown in FIG. 7, so that the pulse motor 33 rotates. On the other hand, the timer 43 in which the time data D0 was set is counted down in response to the clock pulses; and, when the timer 43 becomes "0" by inputting the clock pulses of the number corresponding to time T0, the timer 43 outputs a count-out signal.

When the time-out signal is supplied as an interruption signal to the microprocessor 42, the microprocessor 41 determines that the exciting times of the A and $\overline{B}$ phases are finished and specifies two phases, e.g., the A and B phases, to be excited next. Then, it sets those phases into the output port 42 and, at the same time, reads out the next phase change-over time data D1 from the ROM 44 and sets the data D1 into the timer 43. At this time, as shown in FIG. 7, the drive circuit 45 supplies the driving pulses to the A and B-phase exciting windings, allowing a rotor 33r of the pulse motor 33 to further rotate. When the timer 43 is counted down by only the data D1 which was set and becomes "0", a count-out signal is again output. In this way, the exciting phases are sequentially switched over two phases at a time, so that the pulse motor 33 is rotated by the two-phase excitation and the lens block 8 which is moved by this pulse motor 33 reaches a predetermined position, then a stop signal is input to the microprocessor 41. The microprocessor 41 specifies one phase, e.g., the B phase, in response to this stop signal and sets the B-phase specification data into the output port 42. In response to this data, the drive circuit 45 supplies the driving pulses to only the B-phase exciting winding to stop the rotor 33r by the B-phase excitation. The movement of the lens block 8 is stopped in conjunction with the stoppage of motor rotation.

As described above, the pulse motor driving apparatus of the present invention drives the pulse motor 33 by two-phase excitation when the lens block 8 is moved, and stops the motor by single-phase excitation when the lens block is stopped. For example, in cases wherein the stopping position of the pulse motor 33 is phase A, the exciting phases are switched over to a sequence as such A→AB→B$\overline{A}$→$\overline{AB}$→$\overline{B}$A→AB→B, when the lens block is moved, and the motor is stopped in one phase B (though not being limited to phase B) again, when the lens block is stopped. In this way, since the pulse motor 33 stops at the position of single-phase winding, even if the excitation is cut off, the motor can keep its position, due to the detent torque of the pulse motor. Therefore, such a conventional dislocation of the stopping position as previously mentioned will not occur and it is also possible to prevent unnecessary excitation. Moreover, a strong torque can be secured when the lens block 8 is moved, since it is driven by two-phase excitation.

Furthermore, in the above-described embodiment, although the case cited is one wherein the present invention is applied to a driving apparatus, to move the lens block in setting a copy magnification power in a copying machine, this invention is not limited to this apparatus. Specifically, the present invention can be applied to any other apparatus driven by a pulse motor.

What is claimed is:

1. A pulse motor driving apparatus for driving a pulse motor having a plurality of phase windings, said apparatus comprising:

exciting phase specifying means for sequentially specifying said plurality of phase windings of said pulse motor, on a two-phase unit basis in a driving mode, and for specifying only one of said phase windings in a stopping mode, said exciting phase specifying means including:

(a) means for sequentially outputting phase change-over timing signals, comprising memory means in which phase change-over timing data has been memorized, and timer means whose times are set in response to the timing data of said memory means and which outputs said timing signals at the set times, and (b) means for specifying the exciting phases in response to said timing signals; and means for supplying driving pulses to the specified two of said phase windings in said driving mode, and for supplying a driving pulse to only one of said phase windings in said stopping mode for stopping said motor.

2. A pulse motor driving apparatus according to claim 1, wherein said means for outputting phase change-over timing signals includes clock means for generating clock pulses and said timer means includes means for counting down the set times corresponding to the timing data of said memory means, in response to the clock pulses, and for outputting said timing signals when the count thereof indicates "0".

* * * * *